United States Patent [19]
Wei

[11] Patent Number: 5,447,367
[45] Date of Patent: Sep. 5, 1995

[54] STRUCTURE OF VERTICAL COMPUTER MAINFRAME

[76] Inventor: Hui-Yao Wei, 3F., 23, Alley 11, Lane 59, Musan Rd., Taipei, Taiwan

[21] Appl. No.: 251,193

[22] Filed: May 31, 1994

[51] Int. Cl.$^6$ .................................. A47B 77/08
[52] U.S. Cl. ........................ 312/223.2; 312/263; 312/257.1; 361/685
[58] Field of Search ............. 312/223.2, 223.1, 257.1, 312/263, 265.5, 265.6; 361/685

[56] References Cited

U.S. PATENT DOCUMENTS

| | | | |
|---|---|---|---|
| 3,506,322 | 4/1970 | Richards | 312/257.1 X |
| 4,728,160 | 3/1988 | Mondor et al. | 312/257.1 X |
| 5,067,041 | 11/1991 | Cook et al. | 361/685 |
| 5,124,885 | 6/1992 | Liu | 312/263 X |
| 5,175,670 | 12/1992 | Wang | 361/685 |
| 5,248,193 | 9/1993 | Schlemmer | 312/223.2 |
| 5,319,519 | 6/1994 | Sheppard et al. | 361/685 |
| 5,327,323 | 7/1994 | Yeom et al. | 361/685 |
| 5,332,306 | 7/1994 | Babb et al. | 361/685 X |
| 5,333,097 | 7/1994 | Christensen et al. | 361/685 |
| 5,369,549 | 11/1994 | Kopp et al. | 312/263 X |

*Primary Examiner*—Kenneth J. Dorner
*Assistant Examiner*—Rodney B. White
*Attorney, Agent, or Firm*—Beveridge, DeGrandi, Weilacher & Young

[57] ABSTRACT

A vertical computer mainframe includes a front panel, a shell, a casing and diskdrive racks, etc. The diskdrive racks include an upper rack and a lower rack. The upper rack is mounted at the front end and inside the casing, and the lower rack has one side near the master board, bent into a stepped wall, defining a big chamber and a small chamber of different sizes. The lower rack may be molded from plastic as an integral part. A sliding hard diskdrive may slide into and out of the big chamber. Alternatively, the lower rack may be molded from metal as an integral part, wherein a shell is disposed in the wider chamber and the inner width of the shell is equal to the outer width of the sliding hard diskdrive. In this manner, a large amount of interior space within the computer mainframe is provided for mounting other parts or devices.

15 Claims, 6 Drawing Sheets

STRUCTURE OF VERTICAL COMPUTER MAINFRAME

FIELD OF THE INVENTION

The present invention relates to vertical computer mainframes, and more particularly to such a vertical computer mainframe which has a diskdrive mounting rack having chambers of different widths for mounting 5.25 inch and 3.5 inch floppy diskdrives, sliding hard diskdrives, and/or different auxiliary memory devices.

BACKGROUND OF THE INVENTION

Figure 7:
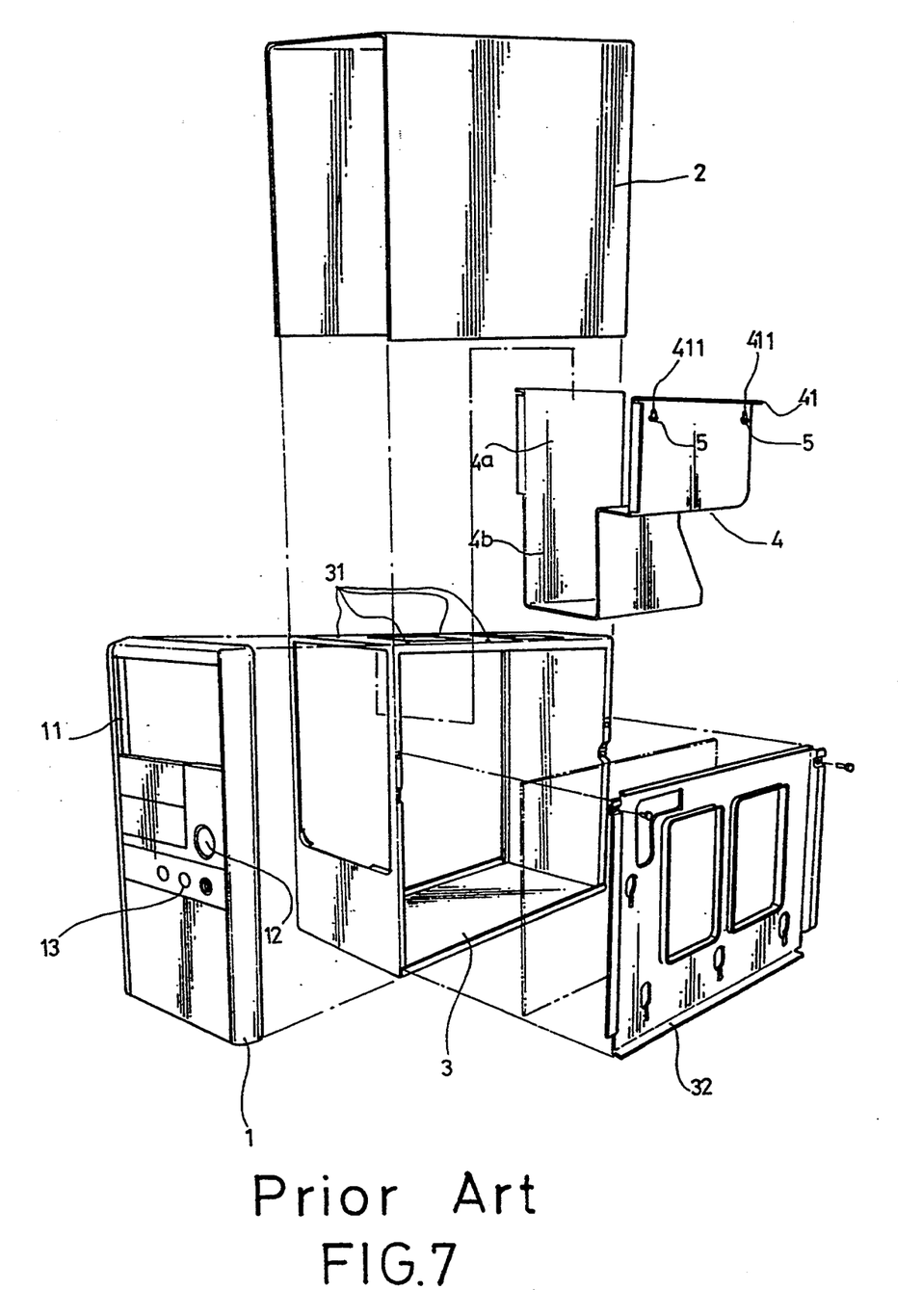
FIG. 7 is an exploded view of a vertical computer mainframe according to the prior art.

A regular vertical computer mainframe as shown in FIG. 7, comprises mainly a front panel 1, a shell 2, a casing 3, and a diskdrive mounting frame 4. The casing 3 is made in rectangular shape disposed in vertical, having a side panel 32 for mounting the master board. The diskdrive mounting rack 4 is mounted inside the casing 3 near the front side thereof for holding diskdrives and other parts. The shell 2 is shaped like a channel plate covered over the top and two opposite lateral sides of the casing 3. The front panel 1 is covered over the front side of the casing 3, having an opening 11 for loading diskdrive onto the diskdrive mounting rack 4, a power switch 12, and a plurality of function keys 13. The diskdrive mounting rack 4 is made in as an integral part having one side bent into a stepped wall and therefore, the width of the upper part of the diskdrive rack 4 is relatively bigger than that of the lower part thereof. The diskdrive mounting rack 4 further comprises two outwardly coupling flanges 41 bilaterally disposed at the top. The outward coupling flanges 41 have round holes 411 connected to respective round holes 31 on the top wall of the casing 3 by screws 5. When installed, a big chamber 4a and a small chamber 4b are defined between the diskdrive mounting rack 4 and the casing 3.

Regular commercially available diskdrives and the related floppy disks, hard disks, or CD-ROMs are internationally standardized. In order to make a hard diskdrive slidable in a computer mainframe, a box is generally needed and installed in the diskdrive mounting rack for allowing the hard diskdrive to be drawn in and out of the box. However, attaching a sliding box to a hard diskdrive greatly increases the installation space of the hard diskdrive.

In the vertical computer mainframe, the small chamber 4b of the diskdrive mounting rack 4 is designed for holding a 3.5 inch floppy diskdrive and a CD-ROM. Auxiliary memory devices may be installed in the big chamber 4a and the small chamber 4b subject to the depth thereof. In order to install a sliding hard diskdrive, the hard diskdrive must be matched with a box. However, if a box is provided for allowing a hard diskdrive to be drawn in and out, the box must be installed in the big chamber 4a (because the width of the small chamber 4b does not allow the box to be inserted into the small chamber 4b). When a box is installed in the big chamber 4a to hold a hard diskdrive for allowing it to be moved in and out of the box, the loading space of the big chamber 4a for holding a 5.25 inch floppy diskdrive and a CD-ROM becomes occupied by the box. When the diskdrive mounting rack 4 is installed in a regular mini type vertical computer mainframe, the big chamber 4a can hold a 5.25 inch floppy diskdrive and a CD-ROM or two 5.25 inch floppy diskdrive, and the small chamber 4b can hold a 3.5 inch floppy diskdrive or a 3.5 inch hard diskdrive. Because of the limitation of the width, the small chamber 4b is not applicable for holding a 5.25 inch floppy diskdrive or a CD-ROM. If the big chamber 4a is occupied by a box for loading a sliding hard diskdrive, the diskdrive mounting rack 4 will have no room for mounting any 5.25 inch floppy diskdrive or CD-ROM.

SUMMARY OF THE INVENTION

It is the principal object of the present invention to provide a vertical computer mainframe which fully utilizes the internal space for conveniently loading a sliding hard diskdrive.

It is another object of the present invention to provide a diskdrive mounting rack for a vertical computer mainframe which allows a sliding hard diskdrive to be installed without affecting the installation of other auxiliary memory devices or increasing the size of the mainframe.

To achieve the aforesaid objects, there is provided a computer mainframe generally comprised of a front panel, a shell, a casing, and a diskdrive mounting rack. The diskdrive mounting rack includes an upper rack and a lower rack. The width of the lower rack is smaller than that of the upper rack. The lower rack may be integrally molded from plastics, defining a big chamber and a small chamber. The inner width of the big chamber is approximately equal to the outer width of the sliding hard diskdrive. Alternatively, the lower rack may be made from a metal sheet through a punching process. The inner width of the big chamber is approximately equal to the outer width of the box for the sliding hard diskdrive so that the box can be installed in the big chamber to hold the sliding hard diskdrive. The big chamber has square holes on two opposite side walls thereof. The box has projecting units, which engage the square holes on the big chamber when the box is inserted into the big chamber. The inner width of the box is approximately equal to the outer width of the sliding hard diskdrive so that the sliding hard diskdrive can be moved in and out of the box. The small chamber has two sets of vertically spaced series of oblong slots on two opposite side walls thereof for mounting two 3.5 inch floppy diskdrives, two 3.5 inch hard diskdrives, or one 3.5 inch floppy diskdrive and one 3.5 inch hard diskdrive vertically.

BRIEF DESCRIPTION OF THE DRAWINGS

The present invention will now be described by way of examples with reference to the annexed drawings, in which.

DETAILED DESCRIPTION OF THE PREFERRED EMBODIMENT

Figure 1:
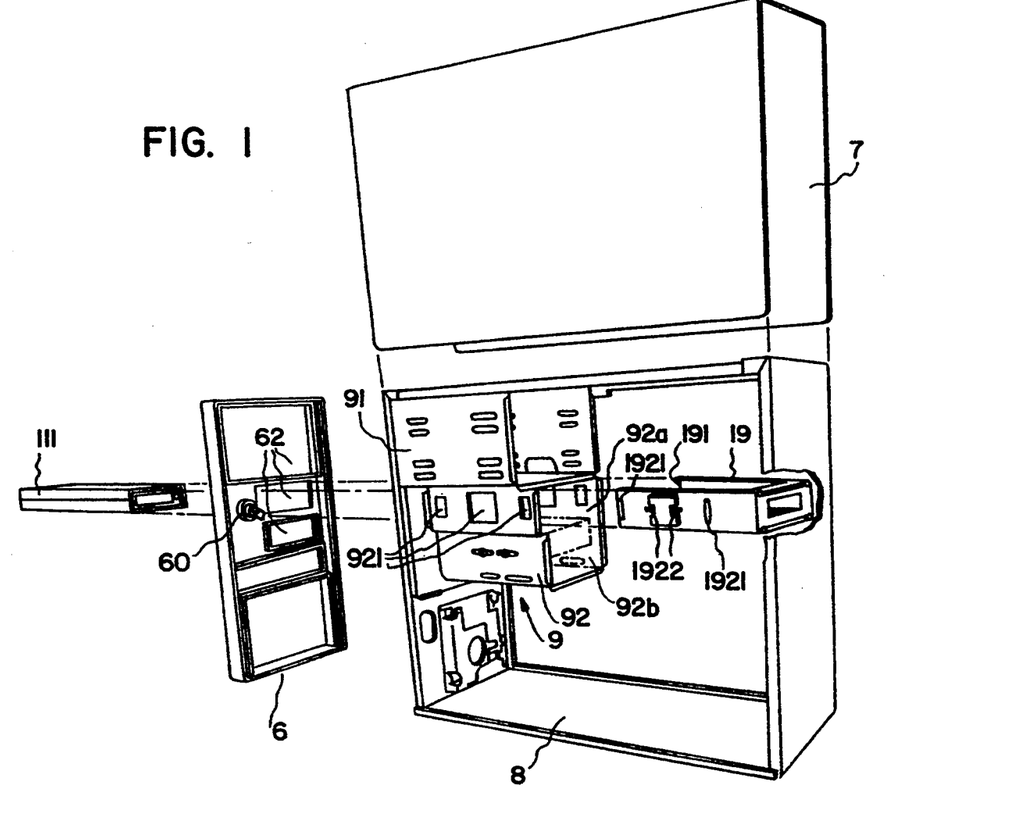
FIG. 1 is an exploded view of a computer mainframe according to one embodiment of the present invention.

Referring to FIG. 1, a vertical computer mainframe in accordance with the present invention comprises mainly a front panel 6, a shell 7, a casing 8, and a diskdrive mounting rack 9. For easy understanding of the present invention, the vertical computer mainframe herein described is a mini type vertical computer mainframe. The casing 8 is for holding the internal parts of the vertical computer mainframe. The front panel 6 is fixed to the front side of the casing 8, having a lock 60 and a plurality of diskdrive slots 62. The diskdrive mounting rack 9 is fixed to the casing 8 on the inside at the top near the front side. The diskdrive slots 62 respectively fit the width of the cross section of the diskdrive mounting rack 9. The diskdrive mounting rack 9 has spaces for mounting 5.25 inch 3.5 inch floppy diskdrives, CD-ROM, and hard diskdrive, etc. The shell 7 is covered over the casing 8.

The diskdrive mounting rack 9 comprises an upper rack 91 and a lower rack 92. The upper rack 91 is shaped like a U-channel mounted inside the casing 8 to hold a 5.25 inch floppy diskdrive and a CD-ROM (for a big scale vertical computer mainframe, the number of auxiliary memory devices to be installed is subject to the vertical depth of the upper rack 91 and the lower rack 92.) The lower rack 92 is substantially shaped like a U-channel of width shorter than that of the upper rack 91. When the lower rack 92 is fixed to the upper rack 91 at the bottom, one lateral side wall of the lower rack 92 is disposed in flush with the corresponding lateral side of the upper rack 91. The upper and lower racks 91 and 92 have outward top flanges with holes (not shown) so that they can be fixed in place by screws. The opposite lateral side wall of the lower rack 92 is bent horizontally inward and then vertically downward to form a step fitting over the master board (not shown) at the top. The lower rack 92 defines on the inside an upper chamber 92a and a lower chamber 92b of different sizes. The upper chamber 92a comprises a plurality of square holes 921 on two opposite lateral side walls thereof for mounting a box 19. The inner width of the box 19 is approximately equal to the outer width of a sliding hard diskdrive 111 can be drawn in and out of the box 19 along a sliding trough defined no two lateral inside walls of the box 19 (see FIG. 2). The lower chamber 92b is for holding a 3.5 inch floppy diskdrive and a fixed type hard diskdrive (see FIG. 3). Alternatively, the opposite lateral side wall of the lower rack 92 may be bent horizontally outward and then vertically downward to form a step fitting over the master board at the bottom so as to change the sizes of the upper chamber 92a and lower chamber 92b relative to each other. Because the sizes of the upper and lower chambers 92a and 92b are interchangeable, auxiliary memory devices can be alternatively installed in either chamber as required.

As another alternate form of the present invention, the upper rack 91 and the lower rack 92 are made in integrally wherein the upper rack 91 has outward top flanges with holes (not shown) fixed to the casing 8 on the inside at the top near the front side by screws. When the diskdrive mounting rack 9 is fixed to the casing 8, the upper rack 91 defines with the casing 8 a holding space. The width of the sectional area of the holding space defined within the upper rack 91 is relatively bigger than that of the lower rack 92. The lower rack 92 defines an upper chamber 92a and a lower chamber 92b of different sectional areas.

Figure 2:
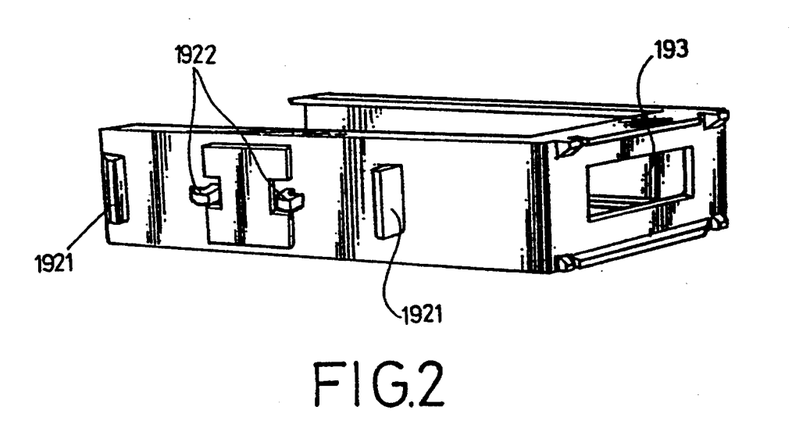
FIG. 2 is an elevational view of a box for a sliding hard diskdrive according to the present invention.

Referring to FIG. 2 and FIG. 1 again, the aforesaid box 19 for mounting inside the lower rack 92 is a hollow, rectangular container molded from plastics and shaped like a U-channel, having a front side open. Through the front open side of the box 19, the sliding hard diskdrive 111 is moved in and out of the box 19. The box 19 defines two sliding ways 191 along two opposite side walls thereof for sliding the sliding hard diskdrive 111. The back side of the box 19 is a closed wall having a connector slot 193 for mounting a connector. The box 19 further comprises two projecting units respectively raised from the two opposite side walls thereof. Each projecting unit comprises a pair of guide projections 1921 respectively disposed near two opposite ends of either side wall of the box 19, and a pair of hook-shaped coupling projections 1922 respectively spaced between the guide projections 1921. The guide projections 1921 on either side wall of the box 19 are made gradually thicker toward their base where they are attached to the side walls of the box 19. The hook-shaped coupling projections 1922 are symmetrically disposed at either side in reversed directions. The height of the coupling projections 1922 is relatively shorter than that of the guide projections 1921.

Figure 3:
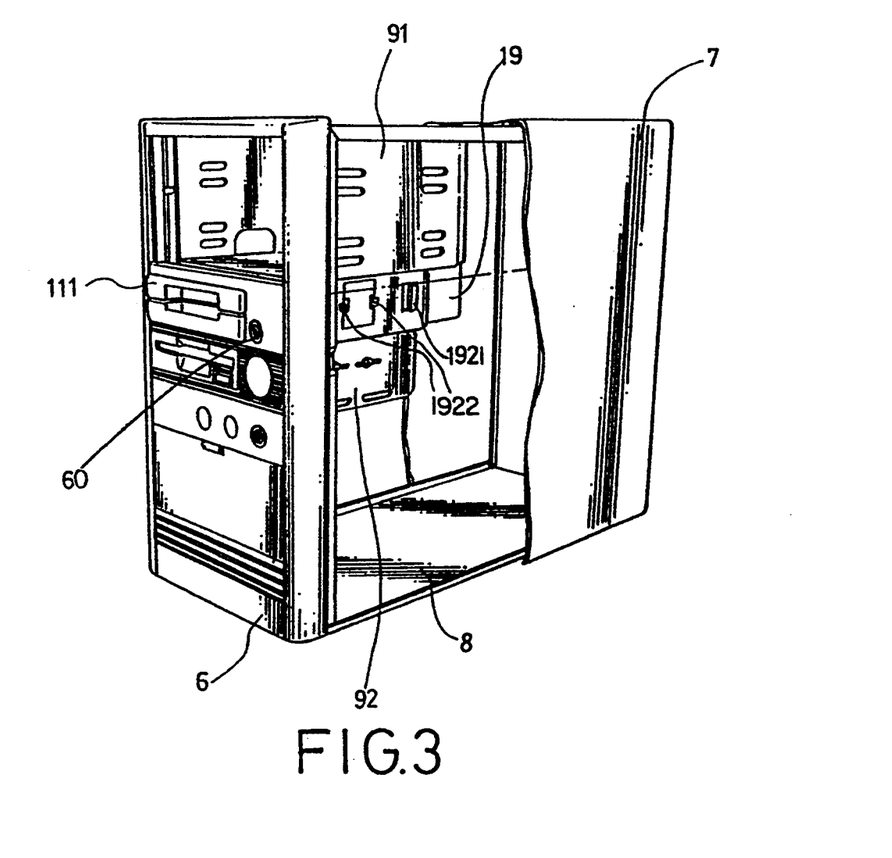
FIG. 3 is a cutaway of the computer mainframe shown in FIG. 1.

Referring to FIG. 3, by squeezing the two opposite side walls of the box 19, the box 19 can be inserted through the front side of the casing 8 into the upper chamber 92a of the lower rack 92. Because the height of the coupling projections 1922 is relatively shorter than that of the guide projections 1921, the insertion of the box 19 into the upper chamber 92a of the lower rack 92 does not cause the opposite coupling projections 1922 to hook in the square holes 921 on the two opposite side walls of the upper chamber 92a. Because the guide projections 1921 have each an outer slope, the box 19 can be conveniently inserted into the upper chamber 92a from the front or back side thereof. When the box 19 is inserted into the upper chamber 92a, the inward compression pressure is released from the two opposite side walls of the box 19, and therefore the projecting units (including guide projections 1921 and coupling projections 1922) are forced into the square holes 921 on the two opposite side walls of the upper chamber 92a, causing each pair of hook-shaped coupling projections 1922 to hook on two opposite ends of the respective square hole 921.

Referring to FIG. 3 again, the upper rack 91 is provided for holding a 5.25 inch floppy diskdrive and a CD-ROM. The lower rack 92 is provided for holding a sliding hard diskdrive within the box 19, and a 3.5 inch floppy diskdrive and a fixed hard diskdrive outside the box 19. Therefore, different diskdrives can be installed in the casing 8.

Figure 4:
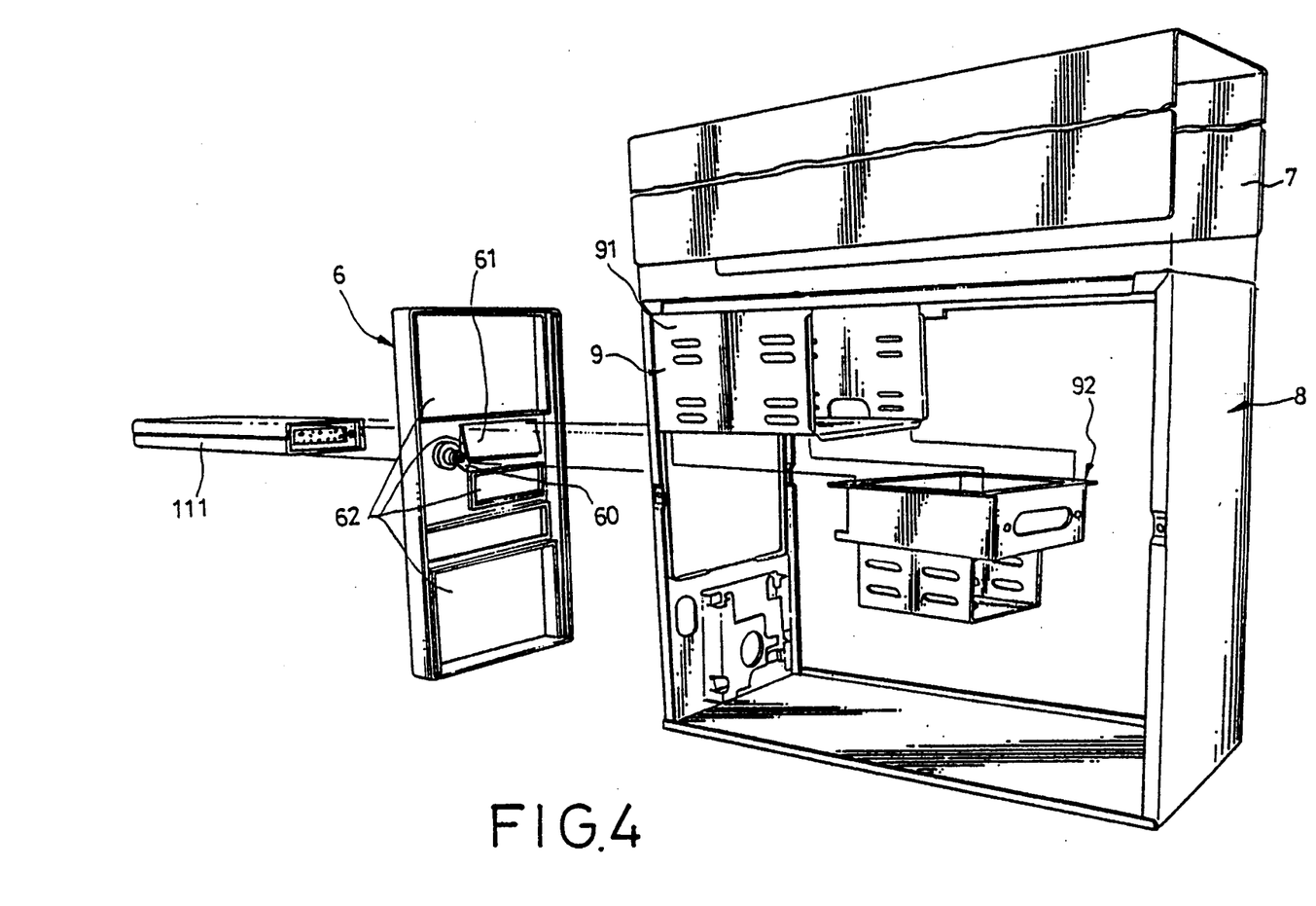
FIG. 4 is similar to FIG. 1 but showing an alternate form of the lower rack.
Figure 5:
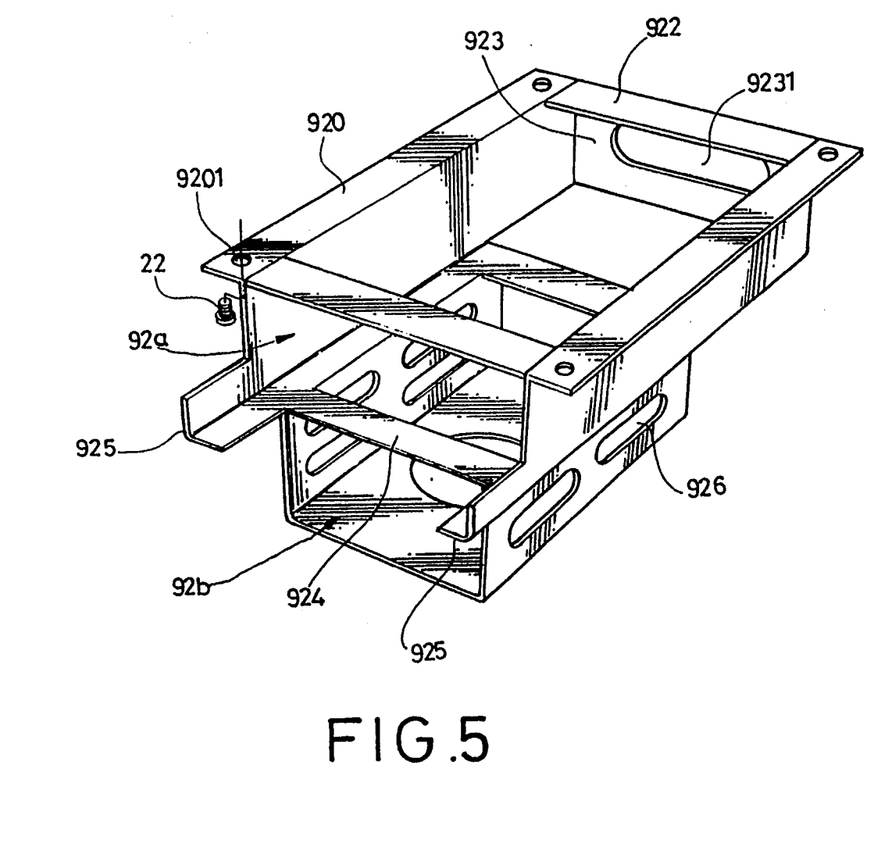
FIG. 5 is an elevational view of the lower rack shown in FIG. 4.
Figure 6:
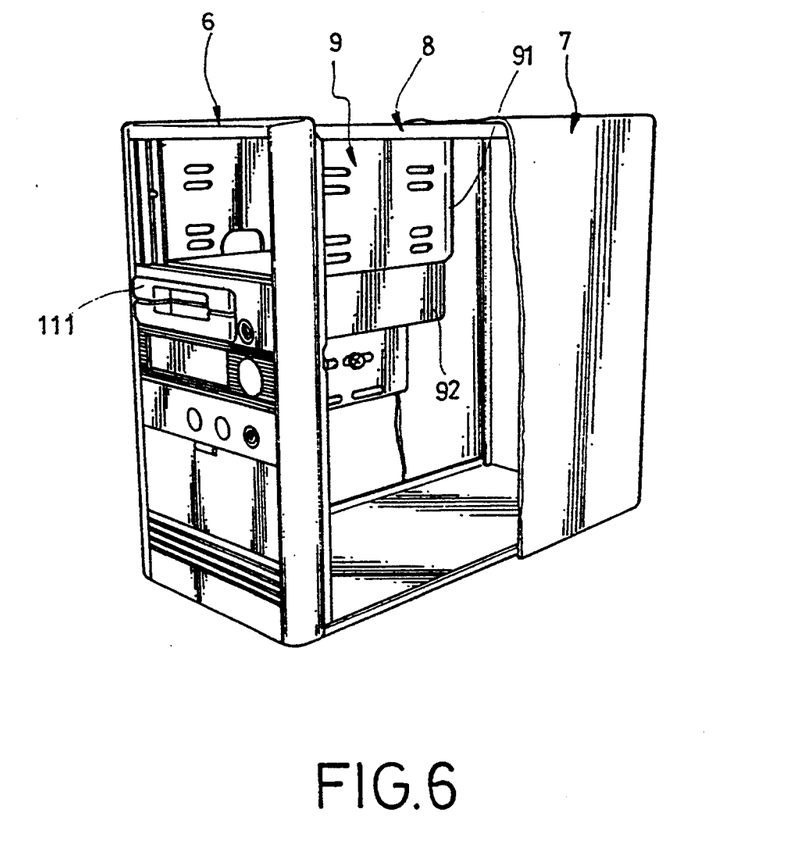
FIG. 6 is a cutaway of the computer mainframe shown in FIG. 4.

Referring to FIGS. 4, 5, and 6, therein illustrated is still another alternate form of the present invention. The diskdrive mounting rack 9 comprises an upper rack 91 and a lower rack 92. The lower rack 92 is directly molded from plastics having two stepped side walls and defining an upper chamber 92a and a lower chamber 92b. The length of the lower chamber 92b is relatively shorter than that of the upper chamber 92a. The upper chamber 92a is provided for holding a sliding hard diskdrive 111. The lower chamber 92b is provided for holding a 3.5 inch floppy diskdrive and a 3.5 fixed hard diskdrive (If the lower rack 92 is molded from a rigid plastic, the thickness of the walls thereof can be relatively reduced, therefore much space is provided within the casing 8 outside the diskdrive mounting rack 9 for mounting other parts or devices). The upper chamber 92a comprises two outward coupling flanges 920 at the top along the length. The outward coupling flanges 920 have screw holes 9201 connected to respective screw holes (not shown) on the bottom wall of the upper rack 91 by screws 22. The lower rack 92 is fixed to the upper rack 91 at the bottom at an offset position spaced from the front end of the upper rack 91, and therefore a double-swinging cover board 61 can be mounted on the front panel 6 and turned within the space between the front panel 6 and the entrance of the upper rack 91. The upper chamber 92a further comprises two upper reinforcing boards 922 transversely disposed between the outward coupling flanges 920 near the two opposite ends thereof, two lower reinforcing boards 924 transversely disposed between the two opposite side walls thereof at the bottom near the two opposite ends thereof, two sliding ways or sliding thoughts 925 longitudinally extending forward from two opposite side walls thereof at the bottom. The back side of the upper chamber 92a is blocked up by a back wall 923 having a connector slot 9231. The lower chamber 92b of the lower rack 9 has two vertically spaced rows of oblong slots 926 on two opposite side walls thereof. By means of the oblong slots 926, a 3.5 inch floppy diskdrive and a 3.5 inch hard diskdrive can be mounted within the lower chamber 92b at different elevations.

By means of extending the width of the upper part of the lower rack 92 sideways or bilaterally, the diskdrive mounting rack 9 provides a space for mounting a sliding hard diskdrive 111. When the upper rack 91 of the diskdrive mounting rack 9 is made about 6 inches wide, it can hold an auxiliary memory device of width approximately equal to 5.25 inch floppy diskdrive. When the lower rack 92 is made about 5 inches wide, a sliding hard diskdrive 111 can be mounted within the lower rack 92. When the lower chamber 92b of the lower rack 92 is made about 4 inches wide, an auxiliary memory device of width approximately equal to 3.5 inches floppy diskdrive can be mounted within the lower chamber 92b. Therefore, it is not necessary to install the slide hard diskdrive 111 in the upper rack 91, and the diskdrive mounting rack 9 has different spaces for mounting different auxiliary memory devices. Because it is not necessary to install the sliding hard diskdrive 111 in the upper rack 91, about 1 inches of installation width is saved.

While only few embodiments of the present invention have been shown and described, it will be understood that various modifications and changes could be made without departing from the spirit and scope of the invention.

What is claimed is:

1. A structure of a vertical computer mainframe, comprising:
a casing for holding electric boards and internal parts of a computer mainframe;
a panel, including a plurality of openings for mounting diskdrives, fixed on a front side of said casing;
diskdrive mounting racks fixed on the front side and inside of said casing, at a top of said casing, wherein said diskdrive mounting racks are located so as to correspond to said openings of said panel; wherein said diskdrive mounting racks include an upper rack and a lower rack; wherein said upper rack may hold two 5.25 inch diskdrives or two CD-ROMs; wherein said lower rack is integrally molded from metal, so as to define a bigger chamber and a smaller chamber, wherein a sliding hard diskdrive may be loaded in the bigger chamber and a 3.5 inch floppy diskdrive or a fixed-type hard diskdrive may be loaded in the smaller chamber; and
a shell fixed on an outside of said casing.

2. A structure of a vertical computer mainframe of claim 1, wherein a width of said bigger chamber in said lower rack is smaller than a width of said upper rack.

3. A structure of a vertical computer mainframe of claim 2, wherein a width of the bigger chamber of said lower rack is made equal to an outer width of said sliding hard diskdrive, so that said sliding hard diskdrive may be received within said bigger chamber.

4. A structure of a vertical computer mainframe of claim 2, wherein said lower rack includes a plurality of holes defined on two opposite lateral side walls thereof, wherein said holes are provided for securing a box which houses said sliding hard diskdrive.

5. A structure of a vertical computer mainframe of claim 4, wherein an inner width of said box is equal to an outer width of said sliding hard diskdrive, so that said sliding hard diskdrive may be received within said box.

6. A structure of a vertical computer mainframe of claim 1, wherein said smaller chamber of said lower rack includes two vertically spaced rows of oblong slots on two opposite side walls thereof, wherein a 3.5 inch floppy diskdrive and a fixed type hard diskdrive may be fixed at said oblong slots.

7. A structure of a vertical computer mainframe of claim 1, wherein said lower rack includes one side bent into a step-shaped wall, so as to fit around a master board of the computer machine.

8. A structure of a vertical computer mainframe, comprising:
a casing for holding electric boards and internal parts of a computer mainframe;
a panel, including a plurality of openings for mounting diskdrives, fixed on a front side of said casing;
diskdrive mounting racks fixed on the front side and inside of said casing, at a top of said casing, wherein said diskdrive mounting racks are located so as to correspond to said openings of said panel; wherein said diskdrive mounting racks include two spaces of different sizes, defining an upper rack and a lower rack; wherein said upper rack may hold two 5.25 inch diskdrives or two CD-ROMs; wherein said lower rack is integrally molded from metal or plastic, defining a bigger chamber and a smaller chamber of different sizes, wherein a sliding hard diskdrive may be loaded in the bigger chamber, and a 3.5 inch floppy diskdrive or a fixed-type hard diskdrive may be loaded in the smaller chamber; wherein said bigger chamber in said lower rack has a smaller width than a width of said upper rack; wherein said lower rack includes a plurality of holes on two opposite lateral side walls thereof, said holes provided for securing a box of said sliding hard diskdrive, wherein a back side of said box has a connector slot for mounting a connector; and two opposite side walls of said box, each of which has a plurality of projecting units respectively raised therefrom and corresponding to said holes on said lower rack, wherein said projecting units may slide into said holes; and wherein two inside lateral walls of said box respectively provide a sliding trough for said sliding hard diskdrive; and a shell fixed on an outside of said casing.

9. A structure of a vertical computer mainframe of claim 8, wherein said projecting unit of said box includes guide projections and coupling projections, wherein said guide projections are disposed near two opposite ends of the two side walls of said box and are made gradually thicker toward a middle of the guide projections, such that an outer side of said guide projections slopes outward toward an end of the side wall of said box; wherein said coupling projections are spaced between said guide projections, and said coupling projections include hooks disposed at either side in reversed directions, wherein a thickness of said coupling projections is less than a thickness of said guide projections.

10. A structure of a vertical computer mainframe, comprising:

a casing for holding electric boards and internal parts of a computer mainframe;

a panel, including a plurality of openings for mounting diskdrives, fixed on a front side of said casing;

diskdrive mounting racks located at the front side and inside of said casing, at a top of said casing, wherein said diskdrive mounting racks are located so as to correspond to said openings of said panel; wherein said diskdrive mounting racks include an upper rack and a lower rack having different sizes; wherein said upper rack may hold two 5.25 inch diskdrives or two CD-ROMs; wherein said lower rack is integrally molded from plastics, defining a bigger chamber and a smaller chamber, wherein a sliding hard diskdrive may be loaded in said bigger chamber, and a 3.5 inch floppy diskdrive and a fixed type hard diskdrive may be loaded in said smaller chamber; and a shell fixed on an outside of said casing.

11. A structure of a vertical computer mainframe of claim 10, wherein a width of said bigger chamber in said lower rack is smaller than a width of said upper rack.

12. A structure of a vertical computer mainframe of claim 11, wherein a connector slot is defined on a back side of said bigger chamber in said lower rack, and a sliding trough is provided on a bottom of both opposite lateral sides of said bigger chamber.

13. A structure of a vertical computer mainframe of claim 11, wherein a width of the bigger chamber of said lower rack is equal to an outer width of said sliding hard diskdrive, so that said sliding hard diskdrive may be received within said bigger chamber.

14. A structure of a vertical computer mainframe of claim 10, wherein said smaller chamber of said lower rack includes two rows of oblong slots on two opposite side walls thereof.

15. A structure of a vertical computer mainframe of claim 10, wherein said lower rack has two opposite lateral sides bent into step-shaped walls.

* * * * *